United States Patent Office 3,454,506
Patented July 8, 1969

3,454,506
CROSS-LINKABLE COMPOSITIONS AND METHOD OF CROSS-LINKING AND FOAMING SAME
Karl Brack, Wilmington, Del., assignor to Hercules Incorporated, Wilmington, Del., a corporation of Delaware
No Drawing. Filed Oct. 4, 1966, Ser. No. 584,117
Int. Cl. C08g 17/14; C08f 27/00; C08d 13/28
U.S. Cl. 260—2.5
16 Claims

ABSTRACT OF THE DISCLOSURE

A cross-linkable composition comprising an ethylenically unsaturated polymer, a latent base, an inorganic hydrate and a precursor of a polyfunctional nitrile N-oxide compound, and method of cross-linking and foaming of said composition.

---

This invention relates to cross-linkable polymer compositions useful as sealants, adhesives, coatings, etc., and to a process of cross-linking said compositions. More particularly, this invention relates to cross-linkable unsaturated polymer compositions which cross-link on initiation with heat.

In the past, it has been known to prepare sealant, adhesive and coating formulations by merely dissolving a polymer in a volatile solvent. Such formulations, while acceptable for many applications, suffer serious drawbacks. For example, such formulations are subject to shrinkage due to the evaporation of the solvent. Another disadvantage is the susceptibility of the resulting uncrosslinked product to attack by solvents. Still other sealant and adhesive formulations are based on cross-linkable two-component systems. In such formulations two reactive components are admixed just before application. One of the disadvantages of this type of formulation is the fact that it must all be used in a short time period before it cures to an unworkable mass.

Now in accordance with this invention, it has unexpectedly been found that compositions can be prepared which have good shelf life but which will cross-link to solid insoluble products when heat triggered. Since the compositions can be prepared without using any solvents, there is no shrinkage upon curing. Typical compositions of this invention contain an unsaturated polymer, a precursor of a polyfunctional nitrile N-oxide compound, an inorganic hydrate, and a latent base. By the term latent base is meant a compound which in the presence of water becomes basic to the extent it will convert one of the precursors described herein to a polyfunctional nitrile N-oxide compound.

Any unsaturated polymer, containing ethylenic unsaturation wherein there is at least one hydrogen radical attached to at least one of the carbon atoms of the ethylenic double bond, can be used in the compositions of this invention. Where fluidized compositions are desired, unsaturated polymers having a molecular weight range of from about 1,000 to about 6,000 are preferred. However, higher molecular weight polymers can be used in conjunction with small amounts of solvents and/or plasticizers to obtain the desired fluidity. Typical unsaturated polymers that can be used are polybutadiene-1,2, polybutadiene-1,4, styrene-butadiene copolymers, isobutylene-isoprene copolymers, natural rubber, polyester resins such as maleate- and fumarate-containing polyesters and polyacrylate esters, butadiene-acrylonitrile copolymers, ethylene-propylene-dicyclopentadiene terpolymers, polychloroprene, polyisoprene, unsaturated alkyd resins such as tall oil alkyd resins, polyether copolymers and terpolymers containing at least two unsaturated epoxide constituents such as propylene oxide-allyl glycidyl ether copolymers and ethylene oxide-epichlorohydrin-allyl glycidyl ether terpolymers, etc., and blends of these polymers with each other. In some cases it may be desirable to use partially hydrogenated products of the above unsaturated polymers.

Any precursor of a polyfunctional nitrile N-oxide compound having the formula selected from the group consisting of

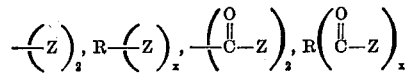

and

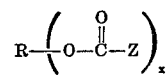

where Z is

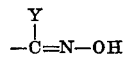

where Y is halogen, i.e., fluorine, chlorine, bromine or iodine, or NO$_2$, R is an organic radical selected from the group consisting of alkylene radicals such as methylene, ethylene, trimethylene, tetramethylene, pentamethylene, hexamethylene, octamethylene, decamethylene, dodecamethylene, octadecamethylene, and the like, cycloalkylene radicals such as cyclohexylene, cyclopentylene, cyclooctylene, cyclobutylene, and the like; arylene radicals such as o-, m-, and p-phenylene, halogenated o-, m-, and p-phenylene, naphthylene, biphenylene and the like; arylene-dialkylene radicals such as o-, m-, and p-xylylene, o-, m-, and p-phenylene diethylene, and the like; alkylene-diarylene radicals such as methylene bis(o-, m-, and p-phenylene), ethylene bis(o-, m-, and p-phenylene), and the like; and cycloalkylene-dialkylene radicals such as 1,2-, 1,3-, or 1,4-cyclohexane-dimethylene, 1,2- or 1,3-cyclopentane dimethylene, and the like; or an alkylene-oxy-alkylene, arylene-oxy-arylene, alkarylene-oxy-arylene, alkarylene-oxy-alkarylene, aralkylene-oxy-alkylene, aralkylene-oxy-aralkylene, or the corresponding thio or sulfonyl radicals such as methylene-oxy-methylene, ethylene-oxy-ethylene, phenylene-oxy-phenylene, methylenephenylene-oxy-phenylenemethylene, phenylenemethylene - oxy - methylenephenylene, ethylene-thio-ethylene, phenylene-thio-phenylene, phenylenemethylene-thio-methylenephenylene, butylene-sulfonyl-butylene, etc., and $x$ is an integer greater than 1, preferably 2 to 10 can be used in accordance with this invention. It is to be understood that the above precursors include low molecular weight polymers having substituted along their chain from about 2 to about 5 hydroximoyl halide groups.

These precursors can be prepared by several methods. For example, the poly(carbohydroximoyl chloride)s having the formula R+Z)$_x$ can be prepared by starting with a polyaldehyde having the desired nucleus such as succinaldehyde (butanedial), adipaldehyde (hexanedial), phthalaldehyde (1,2-benzenedicarbonal), etc., treating the polyaldehyde with hydroxylamine to convert the aldehyde groups to oximes and then treating the resulting compound with nitrosylhalide to convert the oxime groups to hydroximoyl halide groups. Polymers containing hydroximoyl halide groups can be prepared by treating a bis(carbohydroximoyl halide) with ½ the calculated amount of base required to completely convert it to a bis(carbonitrile oxide) in the presence of a low molecular weight unsaturated polymer.

The polyfunctional carbonyl hydroximoyl halides having a formula selected from the group

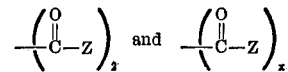

where Y is halogen, can be prepared from poly(haloketones). The haloketones are readily produced by the reaction of a poly(acylhalide) with diazomethane to yield a poly(diazoketone), which in turn, on treatment with a hydrogen halide, yields the desired poly(haloketone). Exemplary of the acid halides that can be converted to such poly(haloketone) are compounds having the formula $XCO(CH_2)_mCOX$ where X is halogen and $m$ is 0 to 10 or higher such as the acid halides of oxalic acid, malonic acid, succinic acid, adipic acid, sebacic acid, 1,2,3,-propanetricarboxylic acid, 1,2,4-pentanetricarboxylic acid, etc., and other cycloaliphatic and aromatic polycarboxylic acids such as 1,4-cyclohexanedicarboxylic acid, 2-carboxy-2-methylcyclohexane acetic acid, ethylene-acrylic acid copolymer, a partially hydrolyzed polyalkyl acrylate, diglycollic acid, p-phenylenediacetic acid, thiodiacetic acid, thiodiproponic acid, 4,4'-sulfonyldibutyric acid phthalic acid, terephthalic acid, 4,4'-biphenyl dicarboxylic acid, trimelletic acid, trimesic acid, naphthalic acid, etc.

Poly(haloacetyl) compounds wherein the haloacetyl groups are directly attached to an aromatic nucleus can also be prepared by introducing two or more haloacetyl groups by means of a normal Friedel-Crafts reaction. Another method is to chlorinate or brominate a polyacetyl aromatic compound in which reaction one chlorine or bromine is introduced into each methyl group. Typical of the poly(haloacetyl) compounds that can be prepared by one or more of these procedures are 1,4-bis(chloroacetyl) benzene, 1,3,5-tris(chloroacetyl) benzene, 4,4'-bis(bromoacetyl) biphenyl, 1,5-bis(chloroacetyl) naphthalene, 4,4'-bis(chloroacetyl) diphenyl ether, etc.

The haloacetyl compounds are then converted to the hydroximoyl halides by reaction with an alkyl nitrite and hydrogen halide under anhydrous conditions. Instead of an alkyl nitrite, other nitrosating agents can be used, as for example, $N_2O_3$, nitrosyl chloride, etc.

An alternative procedure for preparing the polyfunctional carbonylhydroximoyl halides having the formula

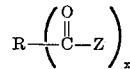

is to nitrosate an aliphatic or aromatic polyketone to produce a poly(oximinoketone) which on halogenation yields the poly(carbonylhydroximoyl halide).

The polyfunctional carbonyl nitrolic acids having the formula

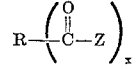

where Y is —$NO_2$, are prepared by the reaction of a polyketone with $N_2O_4$ which yields the poly(carbonyl nitrolic acid) directly.

The polyfunctional carbonylhydroximoyl halides and carbonylnitrolic acids having the formula

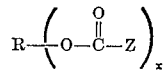

are derived from esters. The carbonylhydroximoyl halides having the above formula, where Y is halogen, are prepared by the reaction of an amino ester hydrochloride with sodium nitrite to form a diazo ester and converting the diazo ester with nitrous acid and a hydrogen halide to the hydroximoyl halide. Thus, for example, with glycine, or one of its precursors, such as aminoacetonitrile, it is possible to prepare a wide variety of glycinate esters from diols, triols, etc., which can then be converted by this route to the polyfunctional carbonylhydroximoyl halides. The carbonylnitrolic acids having the above formula where Y is —$NO_2$ are prepared from beta-ketoesters. For example acetoacetic acid esters can be readily prepared by the reaction of diketene with polyols and then nitrosating the beta-ketoester with aqueous nitrous acid to yield the corresponding oximinoketoester. Treatment of these compounds with concentrated nitric acid gives the nitrolic acid in excellent yield, and treatment of the nitrolic acid with a hydrogen halide then yields the hydroximoyl halide. Actually, the reaction can be carried out in one step by reacting the oximinoketoester with a mixture of nitric acid and hydrogen halide to yield the hydroximoyl halide directly. Still other methods of preparing the precursors will be apparent to those skilled in the art.

Any inorganic hydrate which is stable at room temperature and inert to the other ingredients but which releases a substantial amount of its water of hydration at a temperature within the range of from about 50° C. to about 200° C. can be used in the compositions of this invention. Exemplary inorganic hydrates are the hydrates of metal sulfates such as ferrous sulfate, cupric sulfate, calcium sulfate, magnesium sulfate, lithium sulfate, nickel sulfate, thallic sulfate, zinc sulfate, etc., the hydrates of metal phosphates such as chromic phosphate, magnesium pyrophosphate, potassium pyrophosphate, tribasic sodium phosphate, etc.; the hydrates of metal phosphites such as manganese phosphite, sodium ortho phosphite, etc.; the hydrates of metal chromates such as magnesium chromate, lithium chromate, etc.; the hydrates of metal dichromates such as cupric dichromate, lithium dichromate, sodium dichromate, etc.; the hydrates of metal sulfides such as potassium mono sulfide, etc.; the hydrates of metal borates such as lead meta borate, sodium tetraborate, etc.; the hydrates of metal molybdates such as sodium molybdate, etc.; the hydrates of metal silicates such as sodium silicate, etc.; the hydrates of metal tartrates such as sodium tartrate, etc.; the hydrates of metal citrates such as sodium citrate, etc.; and the hydrates of metal oxalates such as calcium oxalate, sodium ferric oxalate, strontium oxalate, etc.

Any compound, which in the absence of water, is inert to the precursor but in the presence of water becomes basic to the extent it will extract hydrogen halide from the hydroxyimoyl halide groups so as to form nitrile N-oxide groups can be employed as the latent base in the compositions of this invention. Typical latent bases are aluminum carbide; the alkaline earth metal oxides and carbonates such as magnesium carbonate, calcium oxide, calcium carbonate, strontium oxide, barium oxide, barium carbonate, etc.; and the metal nitrides which in the presence of water become metal hydroxides and ammonia such as calcium nitride, magnesium nitride, etc. Some of the above-mentioned latent bases generate a gas such as methane or carbon dioxide when reacted with water, thus causing foaming of the composition and resulting in cellular products. The reaction of a latent nonfoaming base such as barium oxide starting with a hydrate such as the hydrate of lead meta borate can be shown by the following equations:

$$Pb(BO_2)_2 \cdot H_2O \rightarrow Pb(BO_2)_2 + H_2O$$

$$BaO + H_2O \rightarrow Ba(OH)_2$$

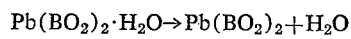
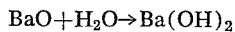

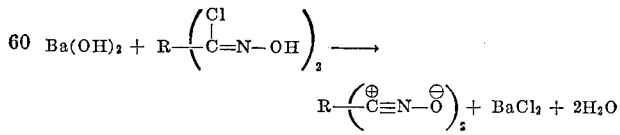

The reaction of a latent foaming base such as aluminum carbide starting with a hydrate such as the hydrate of nickel sulfate can be shown by the following equations:

$$2NiSO_4 \cdot 6H_2O \rightarrow 2NiSO_4 + 12H_2O$$

$$Al_4C_3 + 12H_2O \rightarrow 4Al(OH)_3 + 3CH_4\uparrow$$

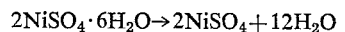
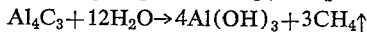

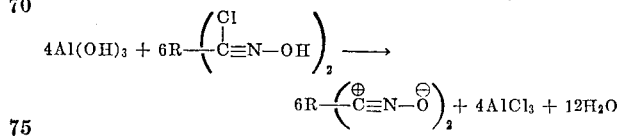

In either case a bis(carbonitrile N-oxide) will be formed and it, in trun, will react to cross-link the unsaturated polymer. It can be seen from the above equations that water is regenerated during the reaction, thus tending to perpetuate the process.

Varied amounts of the four basic ingredients can be employed, depending upon the degree of cross-linking desired, the nature of the unsaturated polymer, etc. In general, the amount of nitrile N-oxide precursor employed (based on the weight of the polymer) will be from about 1% to about 30%, preferably from about 5% to about 20%. The latent base will be present in an amount sufficient to convert the precursor to the corresponding nitrile N-oxide, preferably in an excess of from about 20% to about 100% over that required to convert the precursor to the nitrile N-oxide. The hydrate will, of course, be present in an amount sufficient to convert the latent base into its basic form. Preferably an excess of from about 20% to about 100% over that required to convert the latent base will be used. It should be noted that where a substantial excess of hydrate is used and the composition is heated above 100° C. foaming will result. In some cases such foaming may be desirable. In some cases such foaming may be desirable and it can be regulated by varying the amount of hydrate and temperature of heating.

The cross-linkable compositions of this invention can be prepared by blending or admixing the ingredients in any desired fashion provided that moisture is excluded. For example, the unsaturated polymer and nitrile N-oxide precursor can be dissolved in an anhydrous volatile solvent and ball milled with the other ingredients under an inert anhydrous atmosphere. After milling, the solvent can be removed under reduced pressure.

It may be desirable in certain cases to modify the compositions by prereacting certain of the ingredients. For example, a bis(carbohydroximoyl chloride) can be treated with sufficient free base to convert approximately half of the hydroximoyl chloride groups to nitrile N-oxide groups. When this treatment is conducted in the presence of the unsaturated polymer, the nitrile N-oxide groups will add onto the double bonds producing an unsaturated polymer substituted with carbohydroximoyl chloride substituents. The resulting polymer can be shown as follows:

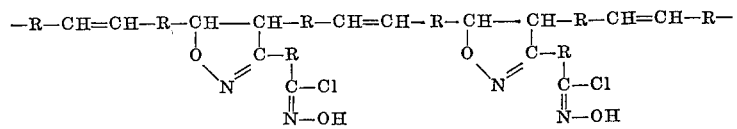

The unsaturated polymer containing a plurality of carbohydroximoyl chloride groups can be mixed with a latent base and hydrate as described above. The resulting composition is stable until heated at which time the hydrate releases its water of hydration converting the latent base which in turn converts the hydroximoyl chloride groups to nitrile N-oxides which will add onto the remaining double bonds cross-linking the polymer.

In addition to the four basic ingredients, other additives can be incorporated. Typical additives are fillers such as carbon black, titanium dioxide, diatomaceous earth, talc, etc.; plasticizers such as phthalates, adipates, sebacates, fatty acid esters of pentaerythritol, fatty acid esters of dipentaerythritol, etc.; stabilizers; adhesive promoters; pigments; and so forth. Obviously, there are cases in which other additives are not required or desired and excellent results are achieved when only the basic ingredients are employed.

As indicated above, the compositions of this invention can be stored for long periods of time. The only requirements of such storage is that the compositions be sealed from moisture and not be overly heated. To initiate cross-linking, the composition has merely to be heated. The temperature of the heat initiation will depend upon the specific hydrate employed. In general, however, temperatures of from about 50° C. to about 200° C. will be used. Temperatures substantially above 200° C. should be avoided as they may decompose the precursor. The heat initiation can be applied either during or after application of the composition. For example, the composition can be heated as it is applied by using a specially heated gun. The heating period will vary according to the specific hydrate employed and the speed of curing desired. If a fast cure is desired, heat should be applied until the cross-linking reaction is substantially complete. If time is not a factor the reaction can merely be triggered by heating for a short period of time and then allowing it to proceed at a more leisurely pace. In general, the period of heating will be from about 1 minute to about 30 minutes. Generally, a nontacky skin will form within a minute or two and the composition will completely cure within a period of from about 3 minutes to about 3 hours depending upon the specific ingredients used and the duration of heating.

The compositions of this invention are useful in numerous applications. For example, they can be used as one-component sealants such as caulking compositions which are fluid enough to extrude into a joint from a caulking gun but will not flow once placed in the joint and which cross-link on heating. By using a latent foaming base, a caulking composition can be prepared that will expand after it is heated. Another use is as an adhesive. Compositions of this invention are excellent adhesives for bonding glass, metals, wood, plastics, fabrics, etc. Still another use is as a coating composition. Further uses will be apparent to those skilled in the art.

The following examples will illustrate the compositions of this invention. All parts and percentages are by weight.

Example 1

A sealant composition was prepared by charging the following ingredients to a ball mill under an anhydrous atmosphere of nitrogen:

| Ingredients: | Parts |
| --- | --- |
| Bis(hydroxyethoxyethyl)dimerate - maleic anhydride copolyester [1] | 26 |
| Terephthalohydroximoyl chloride | 4 |
| Anhydrous barium oxide | 4.3 |
| Plasticizer [2] | 10 |
| MnSO₄·H₂O [3] | 4.8 |
| Anhydrous ethyl ether | 50 |

[1] Containing approximately 14.8% by weight maleic anhydride, having a molecular weight of 2625, a bromine number 36, an acid number of 44, and an ester number of 230.
[2] High boiling pentaerythritol fatty acid ester having an acid number of less than 0.1 and a specific gravity of 0.997 at 25/25° C.
[3] Predried at 50° C. under an atmosphere of nitrogen.

The copolyester and terephthalohydroximoyl chloride were dissolved in the anhydrous ethyl ether. After a homogenous solution was achieved, the solvent was removed under reduced pressure. To the resulting heavy oil was added the barium oxide, manganese sulfate monohydrate and plasticizer. The mixture was milled until all the solids were evenly dispersed. Then the composition was cast as ¼ inch thick samples in an open mold. The samples were heated to a temperature of 145° C. for 5 minutes, during which time they expanded 3 fold and cured to rubbery foams. The samples were tested by immersion in acetone, ethyl ether, methylene chloride, methyl isobutyl ketone, and tetrahydrofuran at room temperature. The samples were insoluble in all the solvents. A sample of the composition stored 2 months in the absence of moisture and heat was soluble in the above test solvents.

Example 2

The following ingredients were charged to a ball mill under an anhydrous atmosphere of nitrogen.

| Ingredients: | Parts |
| --- | --- |
| Bis(hydroxyethoxyethyl) dimerate-maleic anhydride copolyester [1] | 19 |
| Terephthalohydroximoyl chloride | 3 |
| Anhydrous barium oxide | 3.2 |
| Plasticizer [2] | 3.5 |
| $FeSO_4 \cdot 7H_2O$ [3] | 1.2 |
| Anhydrous ethyl ether | 50 |

[1] As described in Example 1.
[2] Poly epichlorohydrin having a molecular weight of 1000.
[3] Predried as described in Example 1.

The copolyester, plasticizer and terephthalohydroximoyl chloride were dissolved in the anhydrous ethyl ether. After a homogeneous solution was achieved, the solvent was removed under reduced pressure. Then the barium oxide and hydrate of ferrous sulfate were added and the mixture milled until all the solids were evenly dispersed. The composition was then cast as ¼ inch thick samples in an open mold. The samples were heated to a temperature of 80° C. for 10 minutes. The resulting cross-linked samples were insoluble in ethyl ether, methylene chloride, tetrahydrofuran and methyl isobutyl ketone. A sample prepared in exactly the same way except for the addition of the hydrate of ferrous sulfate was soluble in the above mentioned solvents.

Example 3

A solution was prepared by dissolving 19 parts of the bis(hydroxyethoxyethyl) dimerate-maleic anhydride copolyester described in Example 1 and 3 parts of terephthalohydroximoyl chloride in 50 parts of anhydrous ethyl ether. The solvent was removed under vacuum leaving a heavy oil. This oil was transferred to a mortar under an anhydrous atmosphere and 1 part of calcium nitride and 8 parts of the predried hydrate of calcium sodium sulfate added. The mixture was ground until a fine, homogenous suspension had been obtained. Then 4 parts of carbon black (medium thermal) was added and the grinding was continued until the mixture was homogenous again. Samples of the composition were cured in open molds at a temperature of 100° C. for 10 minutes as described in Example 1. The samples were insoluble in ethyl ether, acetone, and tetrahydrofuran.

Example 4

The following ingredients were charged to a ball mill under an anhydrous atmosphere of nitrogen.

| Ingredients: | Parts |
| --- | --- |
| Styrene-butadiene copolymer [1] | 19 |
| 4,4'-oxybis(phenyl glyoxylohydroximoyl chloride) | 3 |
| Magnesium nitride | 0.5 |
| $Na_3Fe(C_2O_4)_3 \cdot 5½H_2O$ [2] | 4.5 |
| Anhydrous tetrahydrofuran | 100 |

[1] Having a molecular weight of 2000 and containing approximately 66% styrene.
[2] Predried as described in Example 1.

The copolymer and 4,4'-oxybis(phenyl glyoxylohydroximoyl chloride) were dissolved in the anhydrous tetrahydrofuran. After a homogenous solution was achieved, the solvent was removed under vacuum. To the resulting heavy oil was added the magnesium nitride and hydrate of sodium ferric oxalate. The mixture was milled until all the solids were evenly dispersed. Samples were cast in open molds at a temperature of 110° C. for 10 minutes as described in Example 1. The resulting samples were insoluble in tetrahydrofuran, acetone, toluene, methyl isobutyl ketone and methylene chloride. A sample of the composition stored 2 months in the absence of moisture and heat was soluble in the above test solvents.

Example 5

The following ingredients were charged to a ball mill under an anhydrous atmosphere of nitrogen.

| Ingredients: | Parts |
| --- | --- |
| Polybutadiene 1-4 [1] | 19 |
| Terephthalohydroximoyl chloride | 3 |
| Anhydrous barium oxide | 3 |
| $Na_2SiO_3 \cdot 5H_2O$ [2] | 4.4 |
| Carbon black (medium thermal) | 4 |
| Anhydrous ethyl ether | 50 |

[1] Having a molecular weight of 3000.
[2] Predried as described in Example 1.

The polybutadiene and terephthalohydroximoyl chloride were dissolved in the anhydrous ethyl ether. After a homogenous solution was achieved, the solvent was removed under vacuum. To the resulting heavy oil was added the barium oxide, hydrate of sodium silicate and carbon black. The mixture was milled until all the solids were evenly dispersed. Samples were cast in open molds at a temperature of 100° C. for 10 minutes as described in Example 1. The resulting samples were insoluble in ethyl ether, acetone and methyl isobutyl ketone.

Example 6

The following ingredients were charged to a ball mill under an anhydrous atmosphere of nitrogen.

| Ingredients: | Parts |
| --- | --- |
| Oxyethylene ether of bisphenol A-maleic anhydride copolyester [1] | 19 |
| 4,4'-oxybis(phenyl glyoxylohydroximoyl chloride) | 3 |
| Calcium nitride | 0.5 |
| $Na_3C_6H_5O_7 \cdot 2H_2O$ [2] | 4.5 |
| Anhydrous acetone | 100 |

[1] Having a melting point of 99° C., an acid number of 3 and containing approximately 25% by weight of maleic anhydride.
[2] Predried as described in Example 1.

The copolyester and 4,4'-oxybis(phenyl glyoxylohydroximoyl chloride) were dissolved in the anhydrous acetone. After a homogenous solution was achieved, the solvent was removed under vacuum. To the resulting heavy oil was added the calcium nitride and hydrate of sodium citrate. The mixture was milled until all the solids were evenly dispersed. Samples were cast in open molds at a temperature of 160° C. for 10 minutes as described in Example 1. The resulting samples were insoluble in acetone, tetrahydrofuran, and methylene chloride.

Example 7

The following ingredients were charged to a ball mill under an anhydrous atmosphere of nitrogen.

| Ingredients: | Parts |
| --- | --- |
| Bis(hydroxyethoxyethyl) dimerate-maleic anhydride copolyester [1] | 20 |
| Terephthalohydroximoyl chloride | 3.65 |
| Aluminum carbide | 3.6 |
| Plasticizer [2] | 10 |
| $CuCrO_7 \cdot 2H_2O$ [3] | 4 |
| Carbon black (medium thermal) | 10 |
| Anhydrous acetone | 100 |

[1] As described in Example 1.
[2] As described in Example 1.
[3] Predried as described in Example 1.

The copolyester, plasticizer and terephthalohydroximoyl chloride were dissolved in the anhydrous acetone. After a homogenous solution was achieved, the solvent was removed under reduced pressure. Then the aluminum carbide, hydrate of cupric dichromate and carbon black were added and the mixture milled until all the solids were evenly dispersed. The composition was then cast as ¼ inch thick samples in an open mold. The samples were heated to a temperature of 95° C. for 15 minutes during which time they expanded about 4 fold and cured to medium hard rubbery products. The samples were tested by immersion in acetone, ethyl alcohol, methylene chloride, methyl isobutyl ketone and tetrahydrofuran at room temperature. The samples were insoluble in all the solvents.

Example 8

A sample of the bis(hydroxyethoxyethyl) dimerate-maleic anhydride copolyester described in Example 1 was prereacted with dichloroglyoxime as follows: 20 parts of the copolyester and 2 parts of the dichloroglyoxime were dissolved in 100 parts of anhydrous tetrahydrofuran. Then 1.3 parts of triethylamine dissolved in anhydrous tetrahydrofuran was added dropwise with agitation. After the addition, the reaction mixture was agitated for 30 minutes and then filtered to remove precipitated triethylamine hydrochloride. A suspension of 4 parts of finely ground anhydrous barium oxide and 1.5 parts of the hydrate of ferrous sulfate ($FeSO_4 \cdot 7H_2O$) in the plasticizer described in Example 1 were added with agitation and then the tetrahydrofuran solvent was removed under vacuum at room temperature. Samples of the resulting heavy oil were cured in open molds at a temperature of 80° C. for 10 minutes as described in Example 1. The samples were insoluble in tetrahydrofuran and acetone.

Example 9

The following ingredients were charged to a ball mill under an anhydrous atmosphere of nitrogen.

| Ingredients: | Parts |
|---|---|
| Bis(hydroxyethoxyethyl) dimerate-maleic anhydride copolyester [1] | 15.5 |
| 4,4'-oxybis(phenyl glyoxylohydroximoyl chloride) | 3.8 |
| Anhydrous barium oxide | 2.5 |
| $Na_2MoO_4 \cdot 2H_2O$ [2] | 2.0 |
| Plasticizer [3] | 2.5 |
| Carbon black (medium thermal) | 5.0 |
| Anhydrous acetone | 100 |

[1] As described in Example 1.
[2] Predried as described in Example 1.
[3] As described in Example 1.

The copolyester, plasticizer and 4,4'-oxybis(phenyl glyoxylohydroximoyl chloride) were dissolved in the anhydrous acetone. After a homogenous solution was achieved, the solvent was removed under reduced pressure. Then the barium oxide, hydrate of sodium molybdate and carbon black were added and the mixture milled until all the solids were evenly dispersed. The composition was then cast as ¼ inch thick samples in an open mold. The samples were heated to a temperature of 110° C. for 10 minutes. The resulting cross-linked samples were insoluble in acetone, methylene chloride, methyl isobutyl ketone and tetrahydrofuran.

Example 10

The following ingredients were charged to a ball mill under an anhydrous atmosphere of nitrogen.

| Ingredients | Parts |
|---|---|
| Styrene-butadiene copolymer [1] | 20 |
| 4,4' - bis(phenyl glyoxylohydroximoyl chloride) | 3.5 |
| Anhydrous barium oxide | 3.0 |
| $Na_2MoO_4 \cdot 2H_2O$ [2] | 1.0 |
| Dioctyl phthalate | 5.0 |
| Carbon black (medium thermal) | 10.0 |
| Anhydrous tetrahydrofuran | 200 |

[1] As described in Example 4.
[2] Predried as described in Example 1.

The copolymer and 4,4'-bis(phenyl glyoxylohydroximoyl chloride) were dissolved in the anhydrous tetrahydrofuran. After a homogenous solution was achieved, the solvent was removed under vacuum. To the resulting heavy oil was added the barium oxide, hydrate of sodium molybdate, dioctyl phthalate and carbon black. The mixture was milled until all the solids were evenly dispersed. Samples were cast in open molds at a temperature of 110° C. for 10 minutes. The resulting cross-linked samples were insoluble in tetrahydrofuran, acetone, toluene, methyl isobutyl ketone and methylene chloride.

Example 11

The following ingredients were charged to a ball mill under an anhydrous atmosphere of nitrogen.

| Ingredients: | Parts |
|---|---|
| Bis(hydroxyethoxyethyl) dimerate-maleic anhydride copolyester [1] | 15.5 |
| 4,4'-methylene bis(phenyl glyoxylohydroximoyl chloride) | 3.8 |
| Anhydrous barium oxide | 2.5 |
| $Na_2MoO_4 \cdot 2H_2O$ [2] | 2.0 |
| Plasticizer [3] | 2.5 |
| Carbon black (medium thermal) | 5.0 |
| Anhydrous acetone | 100 |

[1] As described in Example 1.
[2] Predried as described in Example 1.
[3] As described in Example 1.

The copolyester, plasticizer and 4,4'-methylene bis(phenyl glyoxylohydroximoyl chloride) were dissolved in the anhydrous acetone. After a homogenous solution was achieved, the solvent was removed under reduced pressure. Then the barium oxide, hydrate of sodium molybdate and carbon black were added and the mixture milled until all the solids were evenly dispersed. The composition was then cast as ¼ inch thick samples in an open mold. The samples were heated to a temperature of 110° C. for 10 minutes. The resulting cross-linked samples were insoluble in acetone, methylene chloride, methyl isobutyl ketone and tetrahydrofuran.

What I claim and desire to protect by Letters Patent is:

1. A cross-linkable composition comprising (1) an ethylenically unsaturated polymer, (2) a latent base selected from the group consisting of alkaline earth metal oxides, alkaline earth metal carbonates, metal nitrides, and aluminum carbide, and (3) an inorganic hydrate which is stable at temperatures below about 50° C. and which releases at least some of its water of hydration at temperatures of from about 50° C. to about 200° C. and (4) a precursor of a polyfunctional nitrile N-oxide compound having the formula selected from the group consisting of

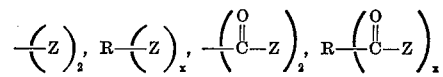

and

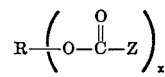

wherein Z is

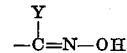

where Y is a substituent of the group consisting of halogens and $-NO_2$, R is an organic radical selected from the group consisting of hydrocarbon radicals, halogenated hydrocarbon radicals, hydrocarbon-oxy-hydrocarbon radicals, hydrocarbon-thio-hydrocarbon radicals and hydrocarbon-sulfonyl-hydrocarbon radicals, and $x$ is an integer greater than 1.

2. The composition of claim 1 wherein the latent base is barium oxide.

3. The composition of claim 1 wherein the latent base is aluminum carbide.

4. The composition of claim 1 wherein the latent base is calcium nitride.

5. The composition of claim 1 wherein the precursor is terephthalohydroximoyl chloride.

6. The composition of claim 1 wherein the precursor is 4,4′-oxybis(phenyl glyoxylohydroximoyl chloride).

7. The composition of claim 1 wherein the precursor is 4,4′-bis(phenyl glyoxylohydroximoyl chloride).

8. The composition of claim 1 wherein the precursor is 4,4′-methylene bis(phenyl glyoxylohydroximoyl chloride).

9. The composition of claim 1 wherein the inorganic hydrate is the monohydrate of manganese sulfate.

10. The composition of claim 1 wherein the inorganic hydrate is the heptahydrate of ferrous sulfate.

11. The composition of claim 1 wherein the inorganic hydrate is the pentahydrate of sodium silicate.

12. The composition of claim 1 wherein the inorganic hydrate is the dihydrate of sodium molybdate.

13. The composition of claim 1 wherein the inorganic hydrate is the dihydrate of sodium citrate.

14. A cross-linkable composition comprising (1) an ethylenically unsaturated polymer containing a plurality of carbohydroximoyl chloride groups, (2) a latent base selected from the group consisting of alkaline earth metal oxides, alkaline earth metal carbonates, metal nitrides, and aluminum carbide, and (3) an inorganic hydrate which is stable at temperatures below about 50° C. and which releases at least some of its water of hydration at temperatures of from about 50° C. to about 200° C.

15. A process of cross-linking an ethylenically unsaturated polymer which comprises heating said polymer at a temperature between about 50° and about 200° C. in admixture with a latent base selected from the group consisting of alkaline earth metal oxides, alkaline earth metal carbonates, metal nitrides and aluminum carbides, an inorganic hydrate which is stable at temperatures below about 50° C. and which releases at least some of its water of hydration at temperatures of from about 50° C. to about 200° C., and a precursor of a polyfunctional nitrile N-oxide compound having the formula selected from the group consisting of

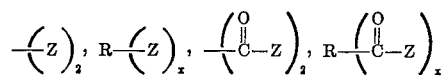

and

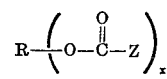

wherein Z is

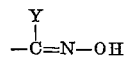

where Y is a substituent of the group consisting of halogens and —NO$_2$, R is an organic radical selected from the group consisting of hydrocarbon radicals, halogenated hydrocarbon radicals, hydrocarbon-oxy-hydrocarbon radicals, hydrocarbon-thio-hydrocarbon radicals and hydrocarbon-sulfonyl-hydrocarbon radicals, and $x$ is an integer greater than 1.

16. The process of claim 15 wherein the unsaturated polymer is foamed and cross-linked.

References Cited
UNITED STATES PATENTS 3,390,204   6/1968   Breslow _____ 260—837

SAMUEL H. BLECH, Primary Examiner.

MORTON M. FOELAK, Assistant Examiner.

U.S. Cl. X.R.

156—330, 332, 333, 334; 260—22, 31.6, 31.8, 32.8, 332, 41, 41.5, 75, 80.78, 83.3, 85.1, 85.3, 88.2, 88.3, 89.5, 92.3, 94.2, 94.7, 724, 770, 768

PO-1050
(5/69)

UNITED STATES PATENT OFFICE
CERTIFICATE OF CORRECTION

Patent No. 3,454,506      Dated July 8, 1969

Inventor(s) Karl Brack

It is certified that error appears in the above-identified patent and that said Letters Patent are hereby corrected as shown below:

Column 2, last line (in patent); Page 5, line 5 (in specification), "R" is omitted in formula.

Column 4, line 71 (in patent); Page 8, line 25 (in specification): In formula: $(\overset{|}{C}\equiv N\text{-}OH)_2$ should read $(\overset{/}{C}=N\text{-}OH)_2$

SIGNED AND SEALED

MAR 24 1970

(SEAL)
Attest:

Edward M. Fletcher, Jr.
Attesting Officer

WILLIAM E. SCHUYLER, JR.
Commissioner of Patents